United States Patent Office 3,850,958
Patented Nov. 26, 1974

3,850,958
METHOD FOR THE PRODUCTION OF SEROTONIN FROM COFFEE WAX
Siddik Iyimen, Saarbrucken, Gunter Lehmann, Bischmisheim, Otto Neunhoeffer, Homburg, Saar, and Otto Vitzthum, Bremen, Germany, assignors to HAG Aktiengesellschaft, Bremen, Germany
No Drawing. Filed Nov. 16, 1972, Ser. No. 307,311
Claims priority, application Germany, Nov. 16, 1971, P 21 56 944.8
Int. Cl. C07d 27/56
U.S. Cl. 260—326.15                                         1 Claim

ABSTRACT OF THE DISCLOSURE

Process for separating serotonin from coffee wax by solvent extraction techniques.

BACKGROUND OF INVENTION

This invention relates to a procedure for separating serotonin from other components present in coffee wax.

Serotonin is a well known pharmaceutically useful product. Chemically, it is identified as 5-hydroxy-3-(2-aminoethyl) indole. It has known endocrinological effects. It is a vasoconstrictor, stimulates intestinal peristalsis, and is involved in the process of blood coagulation. It has been recommended as an antihypertensive and antiallergenic agent, as well as for the treatment of migraine, psychoses, and to control excessive smoking.

Because of its pharmacological importance, there has been an increasing demand for serotonin. Unfortunately, known procedures for its synthesis are excessively expensive. Considerable effort has been expended in making this product more readily available.

Coffee wax is obtained in considerable amounts in the production of caffeine free coffee. It is a complex mixture from which serotonin has been previously separated, but only by using expensive and complicated chromatographic procedures. A procedure for the commercial separation of serotonin from coffee wax has not heretofore been known.

THE INVENTION

A procedure has now been discovered which makes possible the commercial separation of serotonin from the other components in coffee wax. Once separated, the serotonin can be recovered by any of a number of known methods.

The newly discovered technique utilizes a series of extraction procedures involving organic and inorganic solvents of varying polarities. It comprises the steps of:

(1) Adding a lower alkanol suitably containing up to about three carbon atoms to dissolve a fraction containing the serotonin along with other components in Supernatant A and leave an insoluble residue;
(2) Adding water to Supernatant A to precipitate an Intermediate Product I containing serotonin;
(3) Separating the precipitate and taking it up in weakly polar organic solvent to form a Supernatant B containing serotonin and leave an insoluble residue;
(4) Separating Supernatant B and adding a non-polar solvent thereto to precipitate an Intermediate Product II containing serotonin;
(5) Taking up Intermediate Product II in an alkali melt, and diluting the melt with water to form an alkaline solution containing serotonin;
(6) Adjusting the pH of the solution to an acid value to separate dissolved carboxylic acids and form Supernatant C; and
(7) Separating Supernatant C and adjusting the pH to about 6 to thereby form an aqueous solution containing free serotonin.

In the first step of the method, the coffee wax is extracted with a lower alkanol, preferably methanol. The extraction temperature may vary from about room temperature to the boiling point of the selected alkanol. The preferred temperature range is from 30° C. to 60° C. Any convenient extraction apparatus can be employed.

The fraction of the wax which dissolves in the alcohol contains the serotonin along with other substances. An insoluble resin remains and is separated from the supernatant solution.

Water is added to the alcohol solution to precipitate a mixture of non-polar and moderately polar substances containing the serotonin. This mixture is referred to herein for convenience as Intermediate Product I. It contains the serotonin. The highly polar components of the original alcohol solution remain dissolved. It is preferred to wash Intermediate Product I before going on to the next step. The preferred washing media are alkanol-water mixtures containing a major portion of alkanol. The most preferred washing mix is methanol-water in the ratio of about 10:1.

Intermediate Product I is preferably dried, and then taken up in a weakly polar solvent such as lower halogenated hydrocarbons, for example methylene chloride. The fraction of Intermediate Product I containing the serotonin dissolves. The solution (Supernatant B) which contains the serotonin is separated from the insoluble residue.

Intermediate Product II which contains the serotonin is precipitated from Supernatant B by the addition of a non-polar solvent, for example a hydrocarbon solvent such as a benzine fraction boiling at from about 60° C. to 110° C. Intermediate Product II may be taken up in methylene chloride and precipitated with benzine two or more times to assist in the separation of a highly purified final product.

Intermediate Product II is preferably dried and then taken up in an alkali metal hydroxide melt which may contain a small amount of water. The preferred hydroxides are sodium and potassium hydroxide. The ratio of alkali to Intermediate Product II may vary appreciably, but the preferred weight ratio is from about 6:1 to 12:1.

The melt solution turns a dark brown with light carboxylate salts floating on the top. When no more change appears to be taking place (about 10 to 20 minutes at about 170° C. to 190° C.), the melt is diluted with cold water, preferably with ice. This mix is then acidified, suitably with a mineral acid, of which the preferred are hydrochloric and sulfuric acid. The carboxylic acids in the mix separate from solution and are collected to have a Supernatant C.

Supernatant C is adjusted to a pH of about 6 by the addition of an alkaline material, typically sodium or potassium hydroxide. The resulting alkaline solution contains free serotonin which may be isolated in any convenient manner. For example, the solution can be extracted with butanol and serotonin precipitated from the butanol solution with acetone. Like any alkaloid, it can also be precipitated with any of a variety of known precipients. Alternatively, it can be converted into a salt or double salt with creatinine—serotonin creatinine sulfate—and isolated in this form.

The following non-limiting examples are given by way of illustration only:

EXAMPLE 1

Separation of the Intermediate Product I From the Wax 100.0 g. wax are dissolved completely in 500 ml. methanol with stirring and heating at 60° C. The solution is left standing until the temperature has dropped to 30° C., and a resin layer adheres to the bottom of the vessel.

The decanted methanol solution is mixed slowly with 50 ml. water with stirring. A yellow-greenish substance is precipitated, which is filtered off through a suction filter with a diameter of 11 cm. and washed with 100 ml. of a methanol-water mixture (10:1). In order to precipitate the remaining substance, 15 ml. water are again added to the mother liquor, the precipitate is filtered off and washed. The combined precipitates are dissolved in 60 ml. methylene chloride while heating. The solution is cooled and mixed with 400 ml. benzine A, and a beige-colored flocculent substance is precipitated. It is left standing for 10 minutes, then filtered through a suction filter of 11 cm. diameter, and washed with 50 ml. of benzine A. Intermediate Product I thus obtained is again dissolved in methylene chloride, precipitated with benzine A and washed. Subsequently, the Intermediate Product is kept under high suction until it is dry. Yield ab. 8.0 g.

EXAMPLE 2

Alkali Melt

Into a 150 ml. beaker are charged 48.0 g. KOH and 11.0 ml. water. The solution is heated with a pilot flame under stirring to 160° C. Intermediate Product I (8 g.) is then added to the melt in portions (0.5–1.0 g.) with stirring within about 10 minutes and the stirring is continued for about 5 minutes, while the temperature of the melt is kept between 180° C. and 185° C. After the solution has turned dark brown and the carboxylate floating thereon has turned lighter, the melting is stopped by adding about 50 g. ice. It is rinsed in a 800 ml. beaker which contains 85 ml. conc. HCl (D: 1.19) and about 200 g. ice. The carboxylic acids flocculate in the acid solution. The precipitate is filtered through a suction filter of 9 cm. diameter and washed 4 to 5 times with a little water. The filtrate is standardized with KOH solution of a pH of 6. In this aqueous solution the serotonin is present in free form.

EXAMPLE 3

Reaction with Creatinine Sulfate

The dark brown aqueous solution (about 400 ml.) is saturated with 15 to 18 g. ammonium sulfate and extracted twice in a 1 liter shaking funnel with 3000 ml. n-butanol. The process is repeated twice with 200 ml. n-butanol each. The combined butanol extracts are filtered, the filtrate concentrated to 100 ml., then 150 ml. acetone are added. To this solution a creatinine sulfate solution (1.5 g. creatinine sulfate dissolved in 10 ml. hot water and mixed with 30 ml. acetone) is added with stirring at 60° C. and serotonin-creatinine sulfate is precipitated as beige-white crystal flakes. The precipitation is placed for one hour in the refrigerator, then filtered and washed with acetone. The substance is purified by precipitation (dissolved in 100 ml. water and mixed with 300 ml. acetone at 60° C. with stirring). After filtering and washing, the pure substance is dried in the drying cabinet at 60° C. for one-half hour.

Yield: 2.2 g. Melting point: 216° C.
Elementary analysis:

| In percent | C | H | N |
|---|---|---|---|
| Calculated | 41.5 | 5.72 | 17.3 |
| Found | 40.7 | 5.51 | 17.2 |

The IR spectrum of the substance is identical with the original.

What is claimed is:

1. A process for the separation of serotonin from coffee was comprising the steps of:
   A. Adding methanol to said coffee wax to dissolve a fraction containing the serotonin along with other components in Supernatant A and leave an insoluble residue;
   B. Adding water to Supernatant A to precipitate an Intermediate Product I containing serotonin;
   C. Separating the precipitate and taking it up in methylene chloride to form a Supernatant B containing serotonin and leave an insoluble residue;
   D. Separating Supernatant B and adding benzine thereto to precipitate an Intermediate Product II containing serotonin;
   E. Taking up Intermediate Product II in an alkali melt, and diluting the melt with water to form an alkaline solution containing serotonin;
   F. Adjusting the pH of the solution to an acid value to separate dissolved carboxylic acids and form Supernatant C; and
   G. Separtaing Supernatant C and adjusting the pH to about 6 to thereby form an aqueous solution containing free serotonin.

References Cited
UNITED STATES PATENTS
2,947,757  8/1960  Justoni et al. _____ 260—326.15

JOSEPH A. NARCAVAGE, Primary Examiner